H. RAFLOVICH.
WHEEL RIM.
APPLICATION FILED FEB. 26, 1917.
1,271,222.
Patented July 2, 1918.
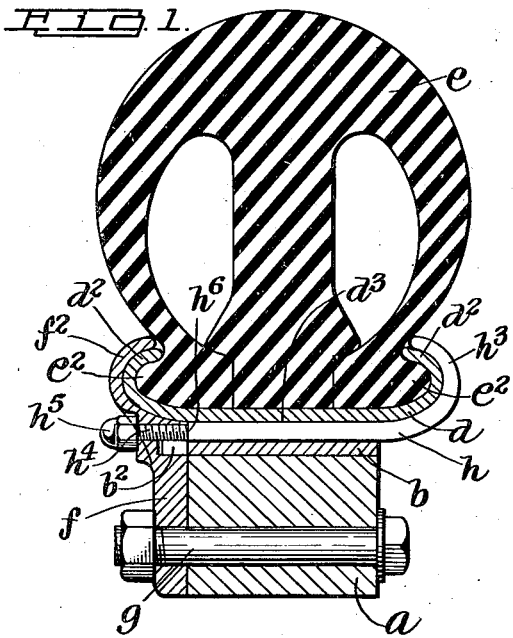
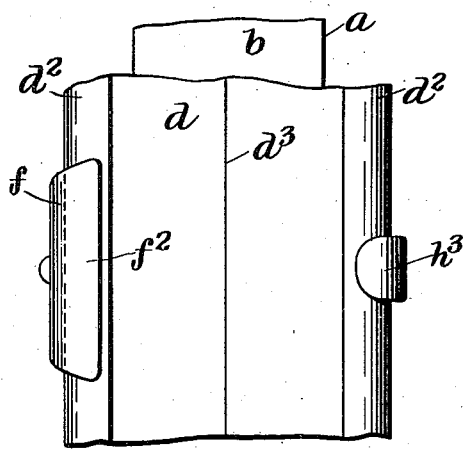
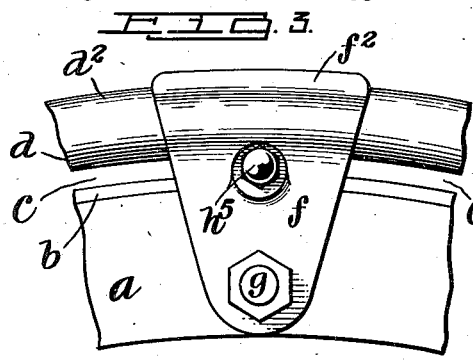
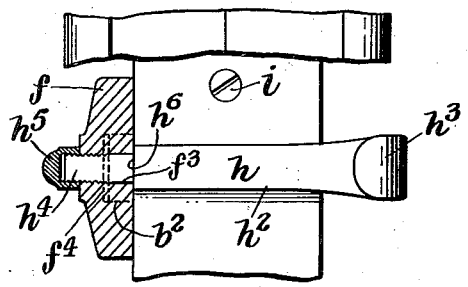
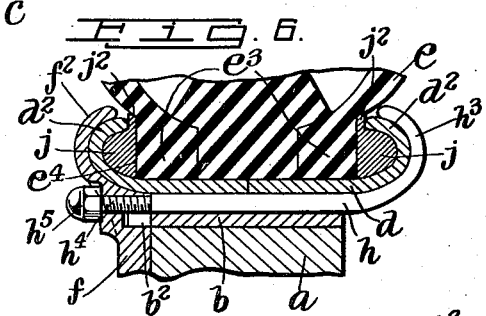
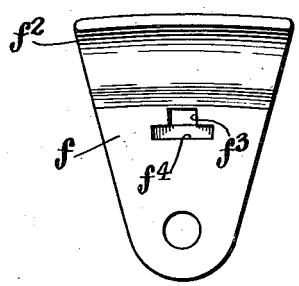
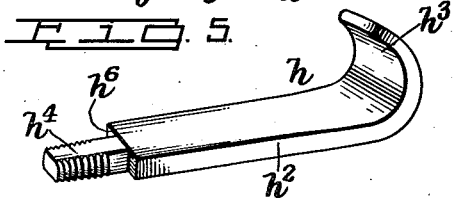
Inventor
Harry Raflovich,
By his Attorneys
Edgar Tate

UNITED STATES PATENT OFFICE.

HARRY RAFLOVICH, OF NEW YORK, N. Y.

WHEEL-RIM.

1,271,222.  Specification of Letters Patent.  Patented July 2, 1918.

Application filed February 26, 1917. Serial No. 150,914.

*To all whom it may concern:*

Be it known that I, HARRY RAFLOVICH, a citizen of the United States, and residing at New York, in the county of New York and State of New York, have invented certain new and useful Improvements in Wheel-Rims, of which the following is a specification, such as will enable those skilled in the art to which it appertains to make and use the same.

This invention relates to the rims of wheels, and the object thereof is to provide improved means for holding detachable, rubber, pneumatic, or similar tires, on said rims, and the invention consists of improved devices of the class and for the purpose specified, constructed and operating as hereinafter described and claimed, and by means of which a tire may be quickly and easily mounted or demounted whenever necessary or desired.

The invention is fully disclosed in the following specification, of which the accompanying drawing forms a part, in which the separate parts of my improvement are designated by suitable reference characters in each of the views, and in which:—

Figure 1 is a transverse section through the rim portion of a wheel and showing my improvement;

Fig. 2 an outer face view of the rim portion of a wheel and showing part of the construction broken away and part in section;

Fig. 3 a side view of the rim portion of the wheel shown in Fig. 1;

Fig. 4 an inner side view of a clamp device, a number of which I employ;

Fig. 5 a perspective view of another clamp device, a number of which I employ; and, Fig. 6 a view similar to Fig. 1 but showing a modification.

In the drawing forming part of this specification, I have shown at $a$ the main rim portion or felly of a wheel with which the spokes are connected. Mounted on the felly $a$ is an annular fixed rim plate $b$ and inclosing the rim plate $b$ and separated therefrom by an annular space $c$ is an annular demountable rim $d$, the opposite edge portions of which are curved outwardly as shown at $d^2$ to form annular hook members by which the tire $e$ is secured in place, and the rim $d$ is divided centrally as shown at $d^3$ into two separate similar parts.

I also provide clamp devices $f$, any desired number of which may be employed, and said clamp devices $f$ are mounted on and secured to the outer side of the main rim portion by bolts $g$ pased therethrough, and the clamp devices $f$ are preferably approximately triangular in form, the wider end portions thereof being directed outwardly, and said wider end portions are formed into hook members $f^2$ which engage with, or overlap, the corresponding annular hook members $d^2$ on the outer side edge of the rim $d$.

I also provide supplemental clamp hooks $h$, comprising an oblong body portion $h^2$ provided at one end with a hook member $h^3$ and at the opposite end with a threaded shank $h^4$ which is oblong or angular in cross section, and the clamp devices $f$ are provided with angular apertures $f^3$ through which the shanks $h^4$ of the clamp hooks $h$ are passed, and in assembling the parts of my improved tire construction, the clamp hooks $h$ are passed outward through the annular space $c$, as shown in Fig. 1, and the shanks $h^4$ thereof are passed through the apertures $f^3$ and provided with nuts $h^5$, whereby the clamp hooks $h$ may be drawn tightly, in which operation they will engage or overlap the annular hook member $d^5$ on the inner side edge of the rim $d$ as shown in Fig. 1, and the separate parts of said tire plate will be securely drawn together and will engage and hold the tire $e$ in the usual manner.

The rim plate $b$ is provided with annular lugs or projections $b^2$ which pass into transverse angular recesses $f^4$ in the clamp devices $f$ inwardly of the angular apertures $f^3$, and this prevents any movement of the clamp devices $f$ on the main rim member $a$, or on the bolts $g$, and said rim plate $b$ is also secured to said main rim member by screws $i$, or any preferred manner.

The tire $e$, in the construction shown, is what is known as a semi-pneumatic tire and is provided with the usual annular rib members $e^2$ which are engaged by the opposite side edge portions of the annular rim $d$ in the usual manner, but my invention is not limited to any particular form or construction of tire, and in Fig. 6, I have shown a modification in which the annular rib members $e^2$ of the tire are omitted, and the tire provided with an inner annular part $e^3$ having straight side faces $e^4$ and independent annular clamp devices $j$ are employed. The clamp devices $j$ comprise body portions having straight inner faces and convex outer side faces which are engaged by the annular hook members $d^2$ of the rim $d$ in the usual manner, and said clamp devices are also preferably provided with upwardly directed flange portions $j^2$.

The clamp hooks $h$, or the body portions thereof, are provided with shoulders $h^6$, and when said clamp hooks are in position, as shown in Figs. 1 and 2, the shoulders $h^6$ bear on the inner sides of the clamp devices $f$, and this prevents said clamp hooks $h$ from being drawn tight enough to force the annular hook members $d^2$ of the rim $d$ inwardly sufficiently to injure or cut the tire, and by means of the construction herein described, the annular rim $d$, or one part thereof, may be quickly demounted by simply detaching the nuts $h^5$ of the clamp hooks $h$ and the tire may also be quickly remounted, or a new one placed in position by reversing this operation.

Having fully described my invention, what I claim as new and desire to secure by Letters Patent, is:—

1. In a wheel rim construction, a felly, an annular rim plate mounted thereon, and an annular demountable rim inclosing the rim plate and separated therefrom by an annular space, said annular rim being divided into two similar parts, clamp devices secured to the outer side of the felly and adapted to engage the corresponding side edge portion of the rim, and clamp hooks passed outwardly through said annular space and having threaded shanks which pass through said clamp devices and are provided with nuts, said clamp hooks being adapted to engage the inner side edge portion of the rim.

2. In a wheel rim construction, a felly, an annular rim plate mounted thereon, and an annular demountable rim inclosing the rim plate and separated therefrom by an annular space, said annular rim being divided into two similar parts, clamp devices secured to the outer side of the felly and adapted to engage the corresponding side edge portion of the rim, and clamp hooks passed outwardly through said annular space and having threaded shanks which pass through said clamp devices and are provided with nuts, said clamp hooks being adapted to engage the inner side edge portion of the rim, and said clamp hooks being provided with shoulders which abut against said clamp devices.

3. In a wheel rim construction, a felly, an annular rim plate mounted thereon, and an annular demountable rim inclosing the rim plate and separated therefrom by an annular space, said annular rim being divided into two similar parts, clamp devices secured to the outer side of the felly and adapted to engage the corresponding side edge portion of the rim, and clamp hooks passed outwardly through said annular space and having threaded shanks which pass through said clamp devices and are provided with nuts, said clamp hooks being adapted to engage the inner side edge portion of the rim, and said clamp hooks being provided with shoulders which abut against said clamp devices, and said annular rim being provided with lugs which enter recesses in said clamp devices.

4. The combination with the felly of a wheel having a demountable rim, of means for securing the rim to the felly comprising a plurality of clamp devices secured to one side of the felly, and clamp hook members having shanks which are passed between the felly and the rim from the opposite side of the felly and detachably secured in said clamp devices, said clamp devices and said hook members serving to support the demountable rim therebetween.

5. The combination with the felly of a wheel provided with a rim, means for securing the rim to the felly comprising a plurality of clamp devices secured to one side of the felly, said clamp devices being provided with central apertures, and clamp hook members provided with shanks which are passed between the rim and the felly from the opposite side of the felly and which are passed through the apertures in said clamp devices and provided with nuts, said clamp devices and clamp hook members serving to support the rim therebetween.

In testimony that I claim the foregoing as my invention I have signed my name, in presence of the subscribing witnesses, this 24th day of February, 1917.

HARRY RAFLOVICH.

Witnesses:
C. E. MULREANY,
H. E. THOMPSON.